(12) United States Patent
Xiao et al.

(10) Patent No.: US 7,950,462 B2
(45) Date of Patent: *May 31, 2011

(54) SCALE INHIBITORS COMPATIBLE WITH SANDSTONE ACIDIZING

(75) Inventors: Zhijun Xiao, Sugar Land, TX (US); Marieliz Garcia-Lopez de Victoria, Sugar Land, TX (US); Francis Tuedor, Katy, TX (US)

(73) Assignee: Schlumberger Technology Corporation, Sugarland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/765,938

(22) Filed: Apr. 23, 2010

(65) Prior Publication Data

US 2010/0200238 A1    Aug. 12, 2010

Related U.S. Application Data

(63) Continuation of application No. 11/458,226, filed on Jul. 18, 2006, now Pat. No. 7,703,530.

(60) Provisional application No. 60/707,033, filed on Aug. 10, 2005.

(51) Int. Cl.
*E21B 21/00* (2006.01)
*E21B 37/08* (2006.01)

(52) U.S. Cl. ........................ 166/311; 166/307

(58) Field of Classification Search ........................ None
See application file for complete search history.

(56) References Cited

U.S. PATENT DOCUMENTS

| | | | |
|---|---|---|---|
| 4,046,707 A | 9/1977 | Smith et al. | |
| 4,681,686 A | 7/1987 | Richardson et al. | |
| 4,913,823 A * | 4/1990 | Lipinski et al. | 210/699 |
| 5,152,403 A | 10/1992 | Patel | |
| 5,181,567 A | 1/1993 | Shuler | |
| 5,529,125 A | 6/1996 | Di Lullo Arias et al. | |
| 6,331,513 B1 | 12/2001 | Zaid et al. | |
| 7,703,530 B2 * | 4/2010 | Xiao et al. | 166/307 |
| 2003/0150613 A1 | 8/2003 | Freiter | |

FOREIGN PATENT DOCUMENTS

| | | |
|---|---|---|
| EP | 0818423 | 1/1998 |
| GB | 2417044 | 2/2006 |

* cited by examiner

*Primary Examiner* — Zakiya W Bates
*Assistant Examiner* — Angela M DiTrani
(74) *Attorney, Agent, or Firm* — Rachel Greene; David Cate; Jeff Griffin

(57) ABSTRACT

Methods are given for making scale inhibitors, that were previously incompatible with fluids containing fluoride ion, compatible with fluids containing fluoride ion. Examples of such scale inhibitors include phosphonates and phosphinopolycarboxylates. The method is replacing alkali metal and alkaline earth metal cations, present in salts or bases, or as counter ions of the scale inhibitors, with hydrogen or ammonium ions. Methods of inhibiting scale formation and of dissolving scales are also given.

11 Claims, 8 Drawing Sheets

SCALE INHIBITORS COMPATIBLE WITH SANDSTONE ACIDIZING

CROSS-REFERENCE TO RELATED APPLICATIONS

This application claims priority as a continuation application of U.S. patent application Ser. No. 11/458,226, entitled, "Scale Inhibitors Compatible with Sandstone Acidizing," filed Jul. 18, 2006, now U.S. Pat. No. 7,703,530, and incorporated by reference herein in its entirety. This application also claims priority to U.S. Provisional patent application Ser. No. 60/707,033, filed Aug. 10, 2005, which is incorporated by reference herein in its entirety.

BACKGROUND OF THE INVENTION

The invention relates to the use of scale inhibitors in the presence of hydrogen fluoride. More specifically, it relates to making scale inhibitors that previously could not be used in the presence of hydrogen fluoride useful in the presence of hydrogen fluoride.

Five principal generic types of inorganic scale inhibitors are commercially available. They are: phosphonates, phosphino-polycarboxylates, polyacrylates, poly vinyl sulphonic acids, and sulphonated polyacrylate co-polymers. Because of the pKa values of the corresponding phosphonic and phosphino-polycarboxylic acids, most phosphonates and phosphino-polycarboxylate scale inhibitors are ineffective at pH values below about 4; they do not dissociate to a sufficient extent at lower pH's. Two methods have commonly been used to address this issue. One method has been to increase the pH (at least partially neutralize the solution) in order to increase the extent of dissociation of the corresponding acids. The other has been to increase the electrostatic attraction of the inhibitor molecules by introducing strongly acidic sulphonic acid groups.

In addition, simultaneous (or sequential) treatment that includes both scale control and matrix acidizing has become more and more attractive due to its cost-effectiveness and operational simplicity. In order to increase the effectiveness of the scale inhibitor, the pH of the inhibitor is generally adjusted high enough (sometimes to greater than 7) to compensate for the pH drop that may occur if there is contamination of the inhibitor by the acid. This is done by adding caustic additives, such as NaOH, $Ca(OH)_2$ or others; there may also even be addition of $NaCl/CaCl_2$ or other salts (to promote precipitation of the inhibitor).

It is well-known that sandstone acidizing fluid systems (HF-based, containing HF or HF sources such as ammonium fluoride or ammonium bifluoride) are incompatible with cations such as $Na^+$, $K^+$, and $Ca^{++}$ in aqueous solution. If concentrations reach certain levels, NaF and similar fluoride salts precipitate.

There is a need for scale inhibitors that can be used in situations in which they may come into contact with fluoride ions.

SUMMARY OF THE INVENTION

We have found that there is no adverse effect on the inhibition performance of phosphonate and phosphino-polycarboxylate scale inhibitors after $Na^+$, $K^+$, and $Ca^{++}$ cations have been replaced by $NH_4^+$. The benefit of this replacement is to make the scale inhibition treatment compatible with HF-based sandstone acidizing treatment fluids.

One embodiment is a method of causing fluids that contain salts, bases, and compounds selected from phosphonates and phosphino-polycarboxylates and mixtures of such compounds, that have cations selected from alkali metals and alkaline earth metals, and mixtures of those cations, to be compatible with fluids containing fluoride ions or fluoride ion sources, by replacing the cations selected from alkali metals and alkaline earth metals, and mixtures, with ammonium cations. Particularly suitable compounds are phosphino-polyacrylates.

Another embodiment is a method of inhibiting scale formation in a wellbore and/or in a subterranean formation and/ or in or on wellbore tools, involving contacting the wellbore and/or formation and/or tools with a fluid containing salts, bases, and compounds selected from phosphonates and phosphino-polycarboxylates and mixtures in which the cations are hydrogen and/or ammonium. Again, particularly suitable compounds include phosphino-polyacrylates.

Yet another embodiment is a method of dissolving a solid material, such as a subterranean formation or a deposit in a subterranean formation or in a wellbore or on wellbore tools. An exemplary method includes contacting the solid material with a fluid that contains one or more than one of an acid, a chelating agent, and mixtures of these dissolvers, and compounds selected from phosphonates and phosphino-polycarboxylates, in which the cations are hydrogen and/or ammonium. Particularly suitable compounds again are phosphino-polyacrylates.

DETAILED DESCRIPTION OF THE INVENTION

Although the invention will be described in terms of scale inhibition, it should be understood that the invention applies as well to matrix acidizing, acid fracturing, scale inhibition, scale dissolution, household or industrial cleaning, and other uses. It is to be understood that scale in the oilfield may be in a formation, in a wellbore, in surface equipment, in or on downhole tools, in fractures, in gravel packs, and in other locations. The invention includes making and using forms of phosphonates and phosphino-polycarboxylates (such as phosphino-polyacrylates) that could not previously be used in the presence of HF or HF sources. Discussions and teachings of "scale inhibitors" and "scale inhibition" are to be understood here to include discussions and teachings of such other uses.

In general, the invention is more advantageous for phosphino-polycarboxylate type scale inhibitors than for phosphonate type scale inhibitors if there is one or more than one of calcium, magnesium, barium, strontium, iron, or aluminum in the environment of use (for example in a subterranean formation) and if the pH of use is low. Although it may be applied to phosphonate type scale inhibitors, it is not generally as advantageous under those conditions because, for example, most subterranean formations contain some calcium, and most phosphonates have first pKa values that are quite low and so they are quite acidic, and calcium phosphonates are relatively insoluble.

Scale inhibitors are normally commercially obtained as concentrates containing salts and bases in which the cations are sodium and/or calcium. The counterions for the active ingredients are also usually sodium and/or calcium. In both cases, this is because these are the easiest and cheapest materials to make, and for many uses these are perfectly suitable. Such materials have many uses in addition to scale inhibition; they may be used (usually in conjunction with acids and/or chelating agents) in matrix stimulation (matrix dissolution, matrix acidizing), in industrial and household cleaners, in scale dissolution in wellbores, in filtercake cleanup, in mudcake removal, and in other uses in the oilfield and elsewhere. The compositions and methods of the invention are also suitable for these uses. As long as fluoride is not present (in the oilfield, for example, that usually means as long as carbonates are being treated, not sandstones) these sodium and/or calcium containing materials are normally suitable as received. However, when fluoride is present, (in the oilfield, for example, that means when sandstones are being treated so that HF or an HF precursor such as ammonium fluoride or ammonium bifluoride is present) then these materials, containing sodium and/or calcium as received, normally are not suitable.

The modified scale inhibitors of the invention (in which alkali metal or alkaline earth cations have been at least partially replaced by ammonium cations) are used in the same way as are conventional scale inhibitors that are compatible with HF and HF sources. The difference is that classes of scale inhibitors that were not previously compatible are compatible following application of embodiments of the invention. The modified scale inhibitors of the invention may be used mixed with treatment fluids (such as acids, chelating agents and solvents) or they may be in fluids injected before or after injection of such treatment fluids. In the past, when scale inhibitors were incompatible with fluids with which they might come in contact, preflushes, spacers and postflushes had to be used carefully to prevent mixing of incompatible fluids; with the modified scale inhibitors of the present invention, such care is not necessary, although such preflushes, spacers and postflushes may still be used if desired.

Phosphonate and phosphino-polycarboxylate materials in the $NH_4^+$ form may be used at many pH's depending upon the use (scale inhibition, scale dissolution, matrix treatment, etc.). If they are first obtained in the free acid form, they may simply be neutralized with $NH_4OH$ up to whatever higher pH is desired (for example from about 1 to about 11). If these scale inhibitors are first obtained as alkali metal or alkaline earth salts, an ion exchange technique or techniques may be used to replace the initially present cation or cations with $NH_4^+$. Such ion exchange techniques include osmosis, reverse osmosis, ion exchange chromatography, electro-ultrafiltration and the like.

Suitable modified scale inhibitors, for example phosphonate suitable compounds, include the ammonium salts (or mixed ammonium/hydrogen salts) of the types of phosphonate materials described in U.S. Pat. No. 5,529,125, hereby incorporated in its entirety. Such compounds include, as non-limiting examples, the ammonium salts of aminotri (methylene phosphonic acid), 1-hydroxyethylidene-1,1-diphosphonic acid, and diethylene triamine penta (methylene phosphonic acid). Suitable phosphino-polycarboxylates include the ammonium salts of, for example, the phosphino carboxylic acids, for example phosphino polycarboxylic acids, for example phosphinoacrylic acid telomers having a weight average molecular weight of from 800 to 5000 as described in European Patent Application No. EP 0 818 423. Other phosphino compounds are described in U.S. Pat. Nos. 4,046,707, 4,681,686, and 5,152,403, all of which are hereby incorporated in their entirety. None of these references indicates that there is any benefit to using the ammonium salt; all teach the use of alkali metal and ammonium salts interchangeably.

Examples

A sample of a concentrate of a scale inhibitor, used commercially for example in sandstone acidizing, was obtained in which the sodium, and calcium occurring in the salts and bases, and as counterions of the scale inhibitor had been replaced with ammonium. We will call the normal scale inhibitor Scale Inhibitor-A (or SI-A) and the modified version Scale Inhibitor-A-Modified (or SI-AM). SI-A (available as PB 3525 from Nalco Company, Houston, Tex., USA) is not compatible with HF (hydrofluoric acid), or sources of HF, due to the high sodium and calcium content in the formulation. In sandstone acidizing, for example, therefore, SI-A would for example have to be added to the acid preflush (HCl or organic acid) stage during the treatment to avoid direct contact between HF and the SI-A. SI-AM was tested to see whether it would be compatible with a sandstone acidizing system under typical acidizing conditions. The compositional differences between the concentrates of SI-A and SI-AM are listed in Table I.

TABLE I

| Component/Element | SI-A | SI-AM |
|---|---|---|
| Phosphino-polycarboxylate | 30% wt | 30% wt |
| Ethylene Glycol | 20% wt | 20% wt |
| Na | 9% wt | 0.59% wt |
| Ca | 0.8% wt | 0 |

Inhibitor Adsorption and Desorption Test

Figure 1A:
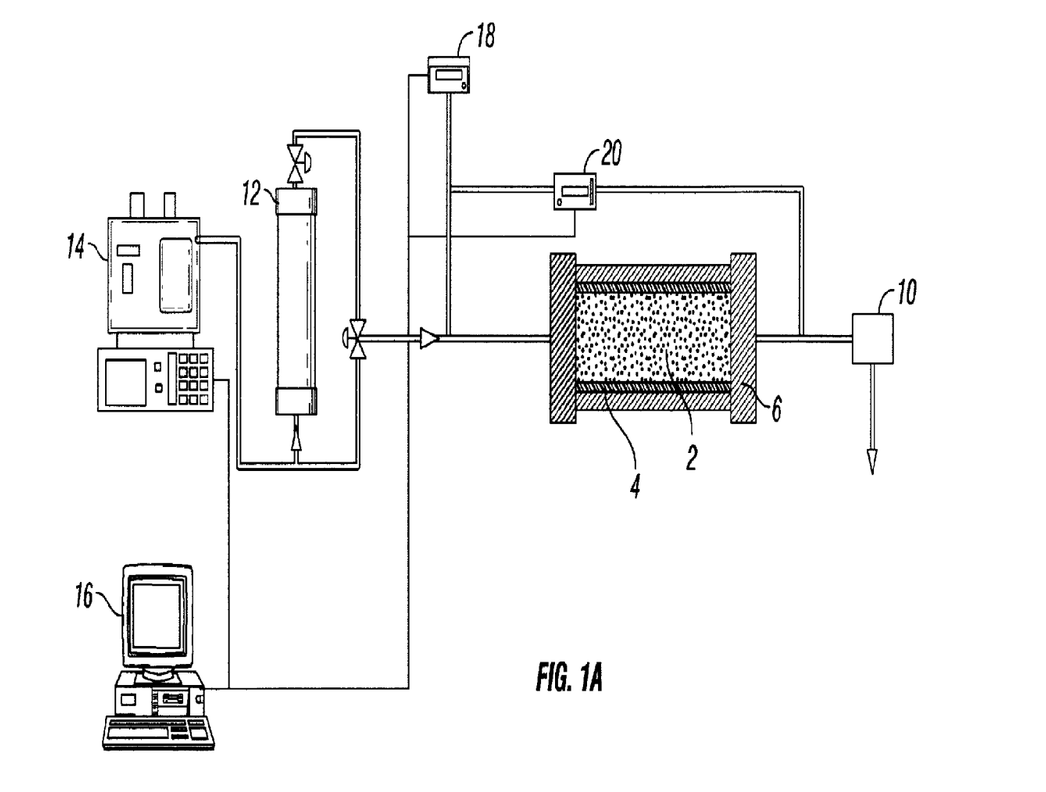
FIG. 1 shows a schematic of a core flow apparatus.
Figure 1B:
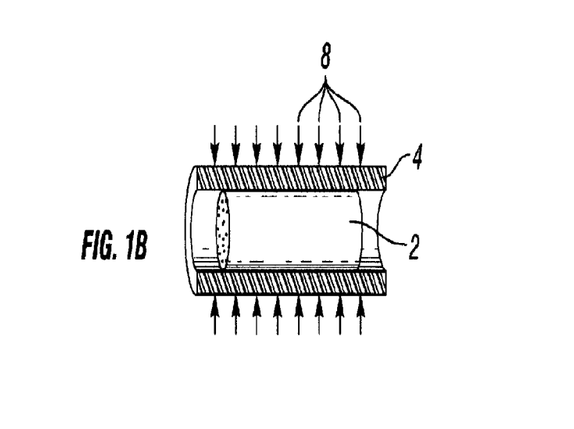

FIGS. 1A and 1B show the experimental apparatus, called a Formation Response Tester. A 15.24 cm (6 inch) long by 2.54 cm (1 inch) diameter Berea sandstone core [2] (about 10-50 mD) was mounted in a sleeve [4] in a Hassler Cell [6] equipped with multiple pressure taps [8]. It was saturated with 5% $NH_4Cl$ solution, and then the core in the cell was loaded into the Formation Response Tester and heated to 93° C. (200° F.). A 6.9 MPa (1000 psi) back pressure (controlled by back pressure regulator [10]) and 13.8 MPa (2000 psi) confining pressure (source and mode not shown) were applied. Fluid injection was from a storage vessel [12] by a pump [14] controlled by a computer [16]; the system also had an inlet pressure gauge [18] and a differential pressure gauge [20]. Tubing, additional storage vessels, valves, etc. used to switch between fluids and select the pumping direction are not shown. 5% $NH_4Cl$ was injected in the production direction (right to left in the figure) at 5 cc/min to obtain the initial permeability. A fluid containing 10% by volume of one or the other scale inhibitor concentrate was injected for 15 pore volumes in the injection direction (left to right in the figure); an effluent sample was collected for ICP (Inductively Coupled Plasma) elemental analysis after every pore volume. 5% $NH_4Cl$ was again injected in the production direction for 400 pore volumes (PV). Effluent samples were then collected for every 3 PV during the first 20 PV of flow, and then for every 5 PV for the next 30 PV, and then for every 20 PV for the next 250 PV. The samples were analyzed for phosphorous concentration using ICP. 5% NH$_4$Cl was then injected at 5 cc/min to obtain the final permeability in the production direction.

Figure 2:
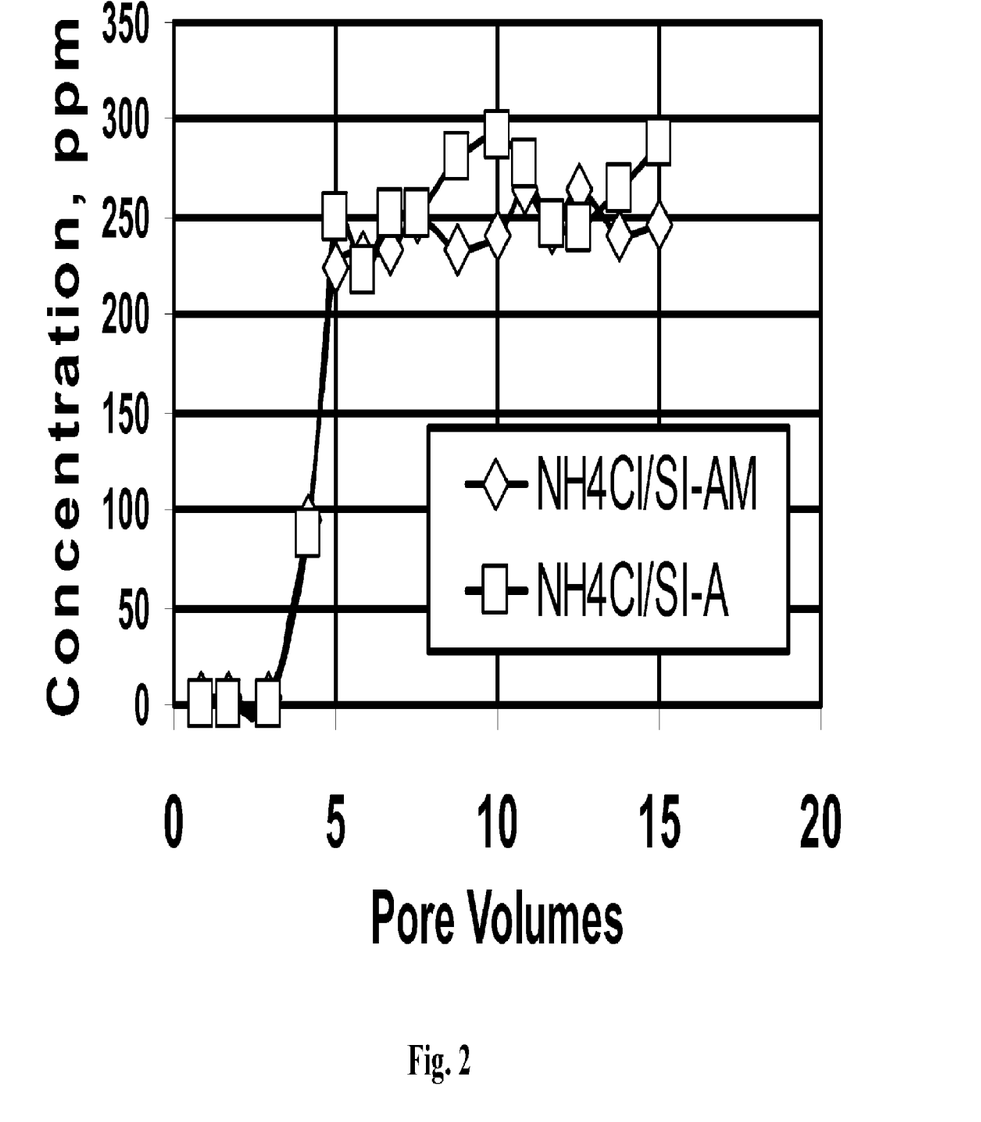
FIG. 2 compares adsorption of a prior art inhibitor and an inhibitor of the invention.

FIG. 2 shows the adsorption similarity of SI-A and SI-AM in the same carrier fluid (5% NH$_4$Cl) at 93.3° C. (200° F.). All of the adsorption process occurred during the first 3 to 4 pore volumes of injection in each case. The adsorption was saturated after about 5 pore volumes of injection in each case, after which the effluent had the same inhibitor concentration as was injected into the core.

Figure 3:
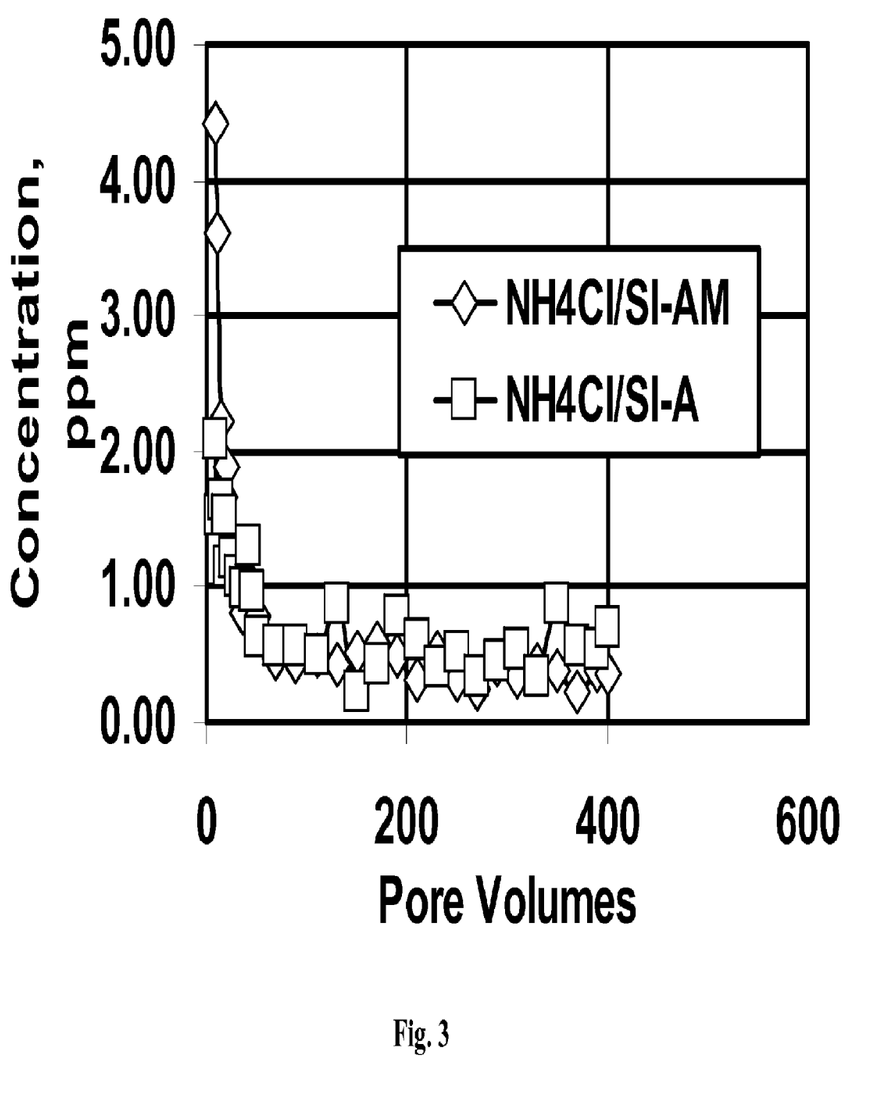
FIG. 3 compares desorption of a prior art inhibitor and an inhibitor of the invention.

FIG. 3 indicates that the desorption of SI-A and SI-AM were also extremely similar at 93.3° C. (200° F.) during flow of 400 pore volumes of 5% NH$_4$Cl flowback brine. The inhibitor concentration (as determined by the phosphorous concentration of about 0.3 ppm) after flooding of each core with 400 pore volumes was well above the minimum inhibitor concentration (which is about 0.04 ppm for this scale inhibitor) in each case.

SI-AM was shown by these experiments to be equivalent to SI-A for scale inhibition with regard to adsorption/desorption properties.

Figure 4:
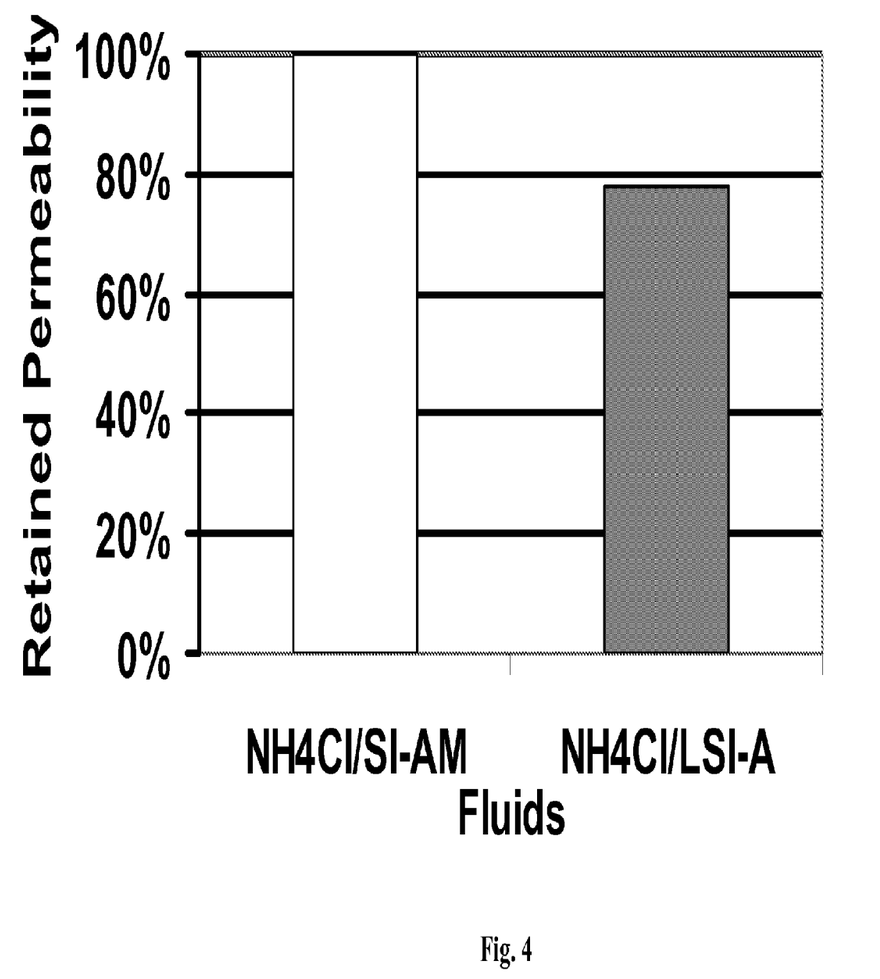
FIG. 4 compares retained permeability on a core of a prior art inhibitor and an inhibitor of the invention.

The retained permeability (in the production direction) of the core samples was determined by comparing the permeability before and after these tests. The results are shown in FIG. 4. The modified inhibitor SI-AM gave higher retained permeability than did the original SI-A. Therefore, from a formation damage standpoint, the modified inhibitor SI-AM performed better than did the original scale inhibitor.

Scale Inhibition Test

Synthetic brine solutions were prepared for CaCO$_3$ and BaSO$_4$/SrSO$_4$ scale inhibition tests as described in Table II. TDS is Total Dissolved Solids.

TABLE II

| Ion or Property | Composition (ppm) | |
| --- | --- | --- |
| | CaCO$_3$ Brine | BaSO$_4$/SrSO$_4$ Brine |
| Ba | 50 | 140 |
| Sr | 50 | 340 |
| Ca | 350 | 1700 |
| Mg | 60 | — |
| SO$_4$ | 0 | 1300 |
| HCO$_3$ | 1000 | 320 |
| TDS | 27000 | 68000 |
| pH | 8 | 6 (CO$_2$ saturation) |

The procedure used was as follows. The brine solution was purged to saturation with CO$_2$, and filtered with a 0.45 µm filter and placed in a clean 50 ml serum bottle. The appropriate amount of scale inhibitor was added, the bottle was purged with CO$_2$, and the bottle was capped and mixed well. All manipulation was done in a manner so as to avoid the introduction of oxygen. The bottles were then incubated for the required time at the desired temperature. After incubation, 20 ml of each sample was filtered through a 0.45 µm filter and the filtrate was acidified with 200 ml of 12 N HCl. Ca and Ba concentrations were determined by ICP. The temperatures and test durations used are listed in Table III. The testing was done in triplicate.

TABLE III

| Testing Parameters | Values | |
| --- | --- | --- |
| | CaCO$_3$ | BaSO$_4$/SrSO$_4$ |
| Temperature ° C. (° F.) | 90.6 (195) | 71.1 (160) |
| Incubation Time (hrs) | 4 | 3 |

Figure 5:
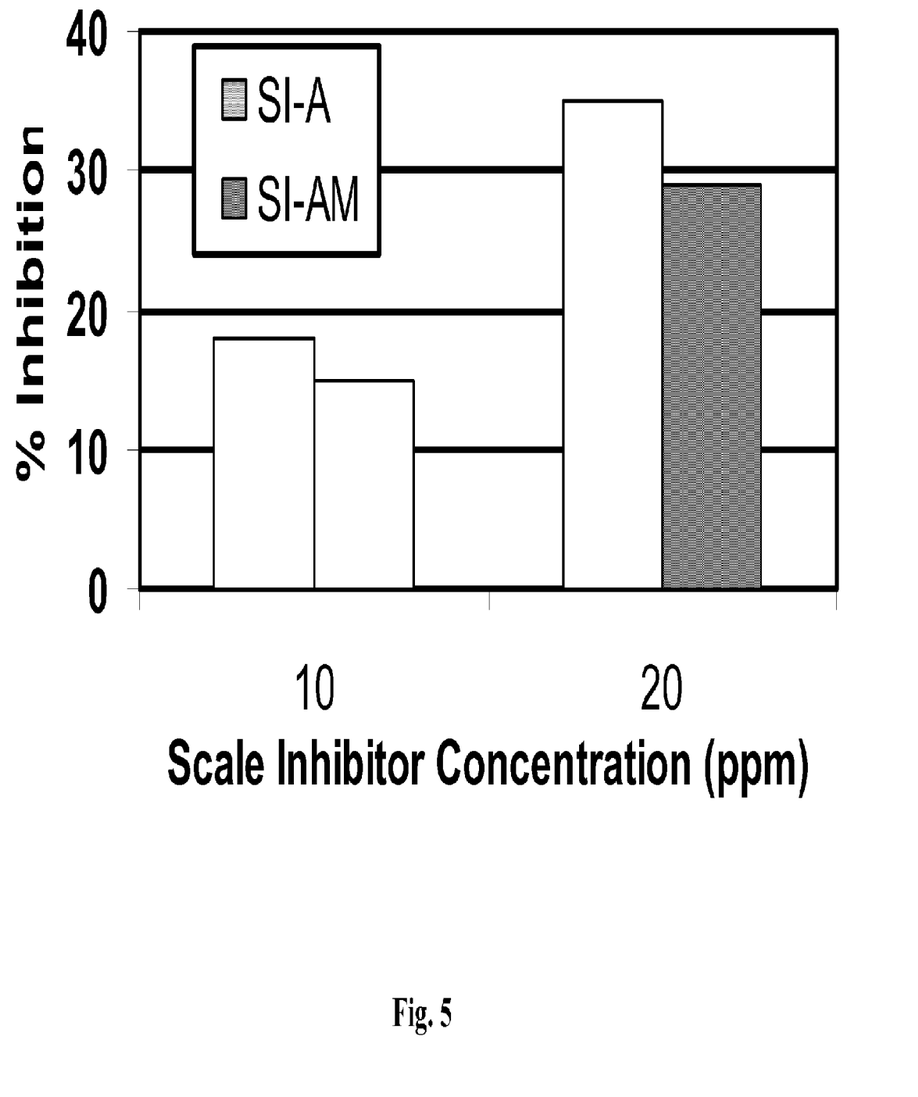
FIG. 5 compares barium sulfate scale inhibition by a prior art inhibitor and an inhibitor of the invention.
Figure 6:
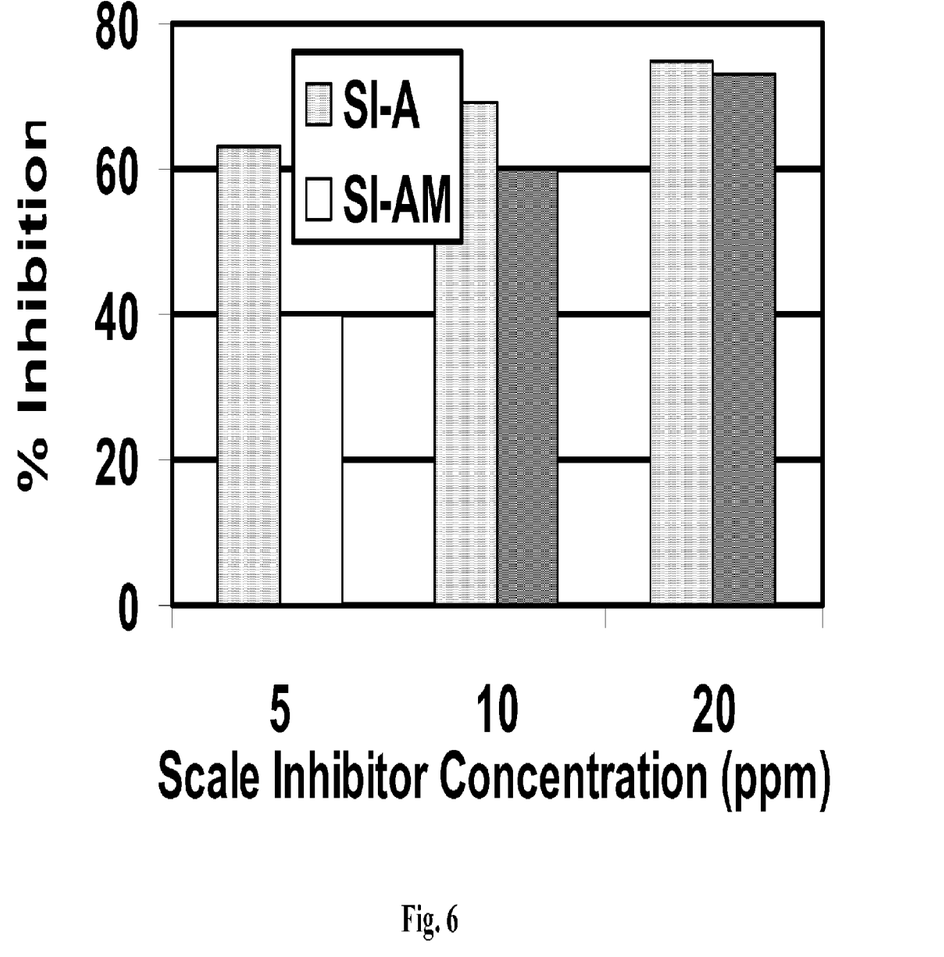
FIG. 6 compares calcium carbonate scale inhibition by a prior art inhibitor and an inhibitor of the invention.

The results of the scale inhibition tests are shown in FIG. 5 for the BaSO$_4$/SrSO$_4$ experiments and in FIG. 6 for the CaCO$_3$ experiments.

Except for the experiments at the very low initial inhibitor concentration of 5 ppm (data not shown for BaSO$_4$/SrSO$_4$), at which SI-AM performed at about 65% of the capacity of SI-A), the SI-AM consistently showed performance that was very similar to that of SI-A for both BaSO$_4$/SrSO$_4$ and CaCO$_3$ inhibition.

Scale Removal Testing

A slurry reactor was used to evaluate the scale removal effectiveness of different fluid systems. The slurry reactor was a modified 4500 series Parr pressure reactor from Parr Instrument Co., with a nominal capacity of 1 L of fluid. The reactor body and wetted internal components were constructed of Hastelloy B, and the heated transfer flask was constructed of Teflon-coated 316 stainless steel. A 60 g sample of ground scale mineral was placed in the reactor cell and preheated to the test temperature. 540 g of weighed fluid (to make the fluid/mineral ratio about 9/1) was pumped into the transfer flask and heated to the required temperature. When both chambers were at the test temperature, the test fluid was transferred to the chamber containing the sample (stirred at 100 rpm) and the test time was started. Samples of fluid (about 3 to 5 ml) were withdrawn from the chamber after 5, 10, 15, 30, 60, 90, 120, 150, and 180 minutes; they were immediately filtered through a 0.20 µm filter, weighed, and diluted with de-ionized water. The samples were then analyzed using Inductively Coupled Plasma optical emission spectrometry (ICP-OES) as soon as possible. The elemental concentrations were expressed as parts-per-million (ppm) of fluid based on the weight of the fluid in the test chamber at the time of sample withdrawal. The effectiveness of a fluid system for removal of an element was evaluated by the concentration of the element in ppm in the reaction solution.

Figure 7:
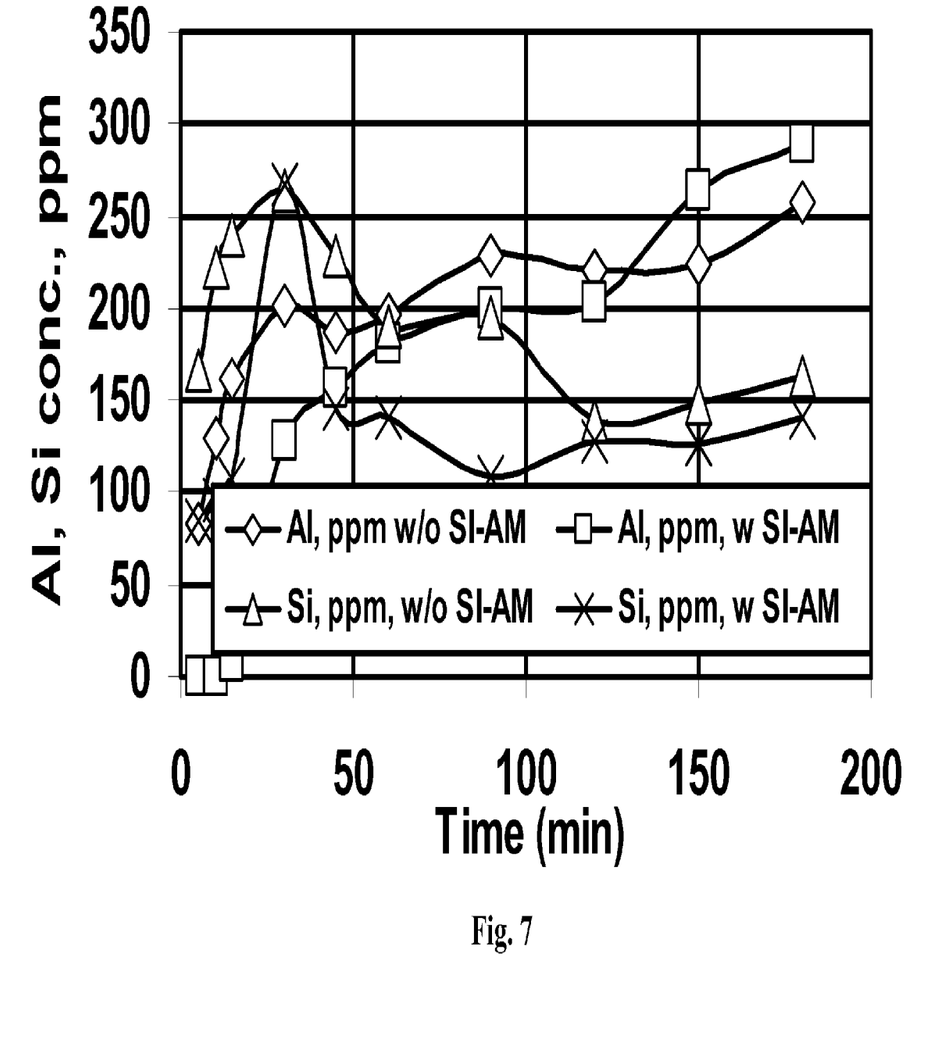
FIG. 7 compares clay dissolution in the presence of a prior art inhibitor and an inhibitor of the invention.
Figure 8:
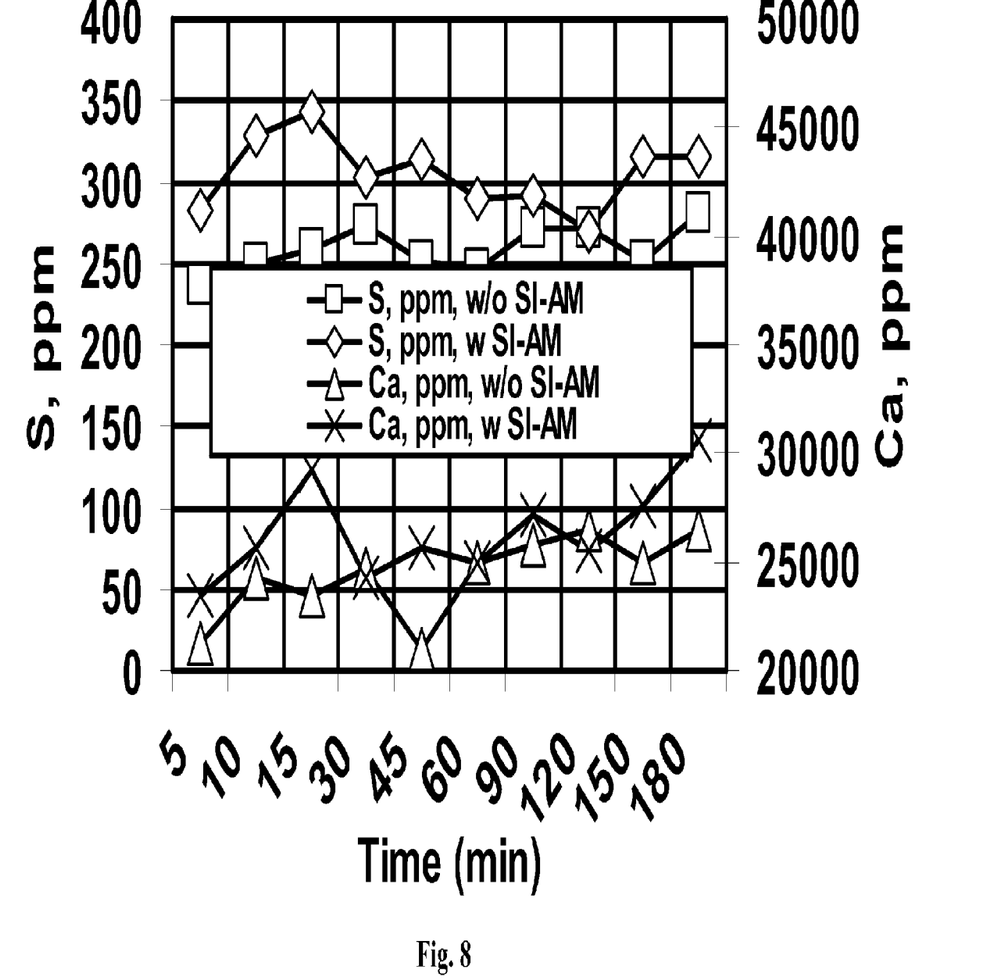
FIG. 8 compares scale dissolution in the presence of a prior art inhibitor and an inhibitor of the invention.

Batch reaction tests using a sandstone acidizing fluid containing an amine chelating agent (diammonium dihydrogen ethylenediaminetetraacetate), an HF source (ammonium bifluoride), and a corrosion inhibitor in water at a pH of about 5.5 with and without SI-AM were used to treat a mineral mixture consisting of 10% kaolinite, 20% barite, and 70% calcite. The scale inhibitor would be considered to be compatible with the dissolution fluid if there was no significant effect on the dissolution by the addition of the inhibitor. The results are shown in FIGS. 7 (ppm Si and Al in the fluid) and 8 (ppm S (as a measurement of sulfate) and Ca in the fluid).

The addition of SI-AM delayed the clay dissolution slightly, but the clay dissolution capacity remained about the same. Addition of SI-AM improved the Ca chelation capacity somewhat, but did not significantly affect the Ca uptake rate. Addition of SI-AM improved the sulfate in solution.

These results show that the modified scale inhibitor SI-AM was compatible with this HF-source-containing sandstone acidizing fluid. This shows that SI-AM may be mixed directly with this HF-source-containing sandstone acidizing fluid for such uses as sandstone matrix dissolution (sandstone acidizing) and sandstone fracturing; it may also be used to provide lasting scale inhibition in conjunction with such treatments.

In addition, it may be used for scale dissolution. It should be noted that the fluid was able to dissolve some $BaSO_4$ mixed with clay and carbonate.

We claim:

1. A method of dissolving at least a portion of a solid material, comprising:
   contacting the solid material with a fluid comprising
      an acid,
      a chelating agent, and
      a compound of phosphino-polycarboxylates,
   wherein cations of the compound consist essentially of hydrogen and ammonium, and
   wherein the solid material comprises an alkaline earth sulfate, an alkaline earth carbonate, an alkali metal sulfate, and an alkali metal carbonate.

2. The method of claim 1, wherein the solid material is located near a surface of one or more than one of a wellbore, a subterranean formation, and a wellbore tool.

3. The method of claim 2, wherein at least one of 1) the one or more than one of a wellbore, a subterranean formation, and a wellbore tool is subsequently contacted with a second fluid comprising fluoride ions or fluoride ion sources, or 2) the fluid comprising a compound of phosphino-polycarboxylates further comprises fluoride ions or fluoride ion sources.

4. The method of claim 1, wherein the fluid further comprises a phosphonate.

5. The method of claim 1, wherein the fluid comprises a phosphino-polycarboxylate having a weight average molecular weight of from 800 to 5000.

6. The method of claim 1, wherein the compound comprises a phosphino-polyacrylate.

7. The method of claim 1, wherein the solid material comprises a portion of a subterranean formation.

8. The method of claim 1, wherein the solid material comprises a scale in a subterranean formation.

9. The method of claim 1, wherein the solid material comprises a scale in a wellbore.

10. The method of claim 1, wherein the solid material comprises a scale on a wellbore tool.

11. The method of claim 1, wherein at least one of 1) the solid material is subsequently contacted with a second fluid comprising fluoride ions or fluoride ion sources, or 2) the fluid comprising a compound of phosphino-polycarboxylates further contains fluoride ions or fluoride ion sources.

* * * * *